(12) United States Patent
Bearss et al.

(10) Patent No.: US 6,678,426 B1
(45) Date of Patent: Jan. 13, 2004

(54) PROGRAMMABLE MAPPING OF LOWER RESOLUTION DIGITAL DATA TO A HIGHER RESOLUTION FOR OUTPUT ON A LOWER RESOLUTION DEVICE

(75) Inventors: James G. Bearss, Boise, ID (US); Eugene A. Roylance, Boise, ID (US); Wayne E. Bradburn, Eagle, ID (US); Arlin R. Jones, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 849 days.

(21) Appl. No.: 09/047,315

(22) Filed: Mar. 24, 1998

Related U.S. Application Data

(63) Continuation-in-part of application No. 08/855,253, filed on May 13, 1997, now abandoned.

(51) Int. Cl.[7] .............................. G06K 9/32; G06F 15/00
(52) U.S. Cl. ........................................ 382/299; 358/1.2
(58) Field of Search ................................ 382/217, 218, 382/254, 266, 267, 298, 299; 358/498, 501, 534, 1.1, 1.2, 1.14, 1.16

(56) References Cited

U.S. PATENT DOCUMENTS

| | | | |
|---|---|---|---|
| 4,847,641 A | 7/1989 | Tung | 346/154 |
| 5,005,139 A | 4/1991 | Tung | 364/519 |
| 5,134,495 A | 7/1992 | Frazier et al. | 358/298 |
| 5,193,008 A | 3/1993 | Frazier et al. | 358/298 |
| 5,299,308 A | 3/1994 | Suzuki et al. | 395/162 |
| 5,359,423 A | 10/1994 | Loce | 358/296 |
| 5,387,985 A | 2/1995 | Loce et al. | 358/447 |
| 5,392,061 A | 2/1995 | Vondran, Jr. | 347/252 |
| 5,424,780 A | 6/1995 | Cooper | 348/428 |
| 5,515,480 A | 5/1996 | Frazier | 395/109 |
| 5,539,866 A | 7/1996 | Banton et al. | 395/117 |
| 5,561,721 A | 10/1996 | Mutz | 382/205 |
| 5,579,445 A | 11/1996 | Loce et al. | 395/102 |
| 5,581,292 A * | 12/1996 | Cianciosi et al. | 347/131 |
| 5,659,399 A * | 8/1997 | Lin et al. | 358/298 |
| 5,666,470 A * | 9/1997 | Parker | 395/106 |
| 5,687,297 A * | 11/1997 | Coonan et al. | 395/102 |
| 5,724,455 A * | 3/1998 | Eschbach | 382/260 |

FOREIGN PATENT DOCUMENTS

EP 0678827 A1 10/1995

OTHER PUBLICATIONS

European Search Report.

\* cited by examiner

*Primary Examiner*—Bhavesh M. Mehta
*Assistant Examiner*—Kanji Patel
(74) *Attorney, Agent, or Firm*—Lane R. Simmons

(57) ABSTRACT

Lower resolution source data is synthesized to a higher resolution format for subsequent rendering on a lower resolution output device. Synthesis occurs by selecting or generating and using a synthesis template that represents a configuration of a plurality of pixel data in the higher resolution format into which the lower resolution source data is to be synthesized. A working or active pixel is identified from the lower resolution source data, a synthesis template is selected, and then the synthesis template pixel data is substituted for the working pixel for rendering on the output device. The synthesized higher resolution data is rendered in a manner such that dots represented by the synthesized data are formed interstitially relative to scan lines of the given lower raster/resolution capability of the output device. The working pixel is identified in the lower resolution data by recognizing a configuration of a plurality of pixel data adjacent the working pixel. The synthesis template comprises at least a two by two cell matrix for pixel placement in the higher resolution format. The synthesis template pixel placement is formed to provide an apparent merge of the pixel data in the higher resolution format with the adjacent pixel data of the lower resolution format data.

22 Claims, 4 Drawing Sheets

PROGRAMMABLE MAPPING OF LOWER RESOLUTION DIGITAL DATA TO A HIGHER RESOLUTION FOR OUTPUT ON A LOWER RESOLUTION DEVICE

CROSS REFERENCE TO RELATED APPLICATIONS

This application is a continuation in part of U.S. application Ser. No. 08/855,253 filed May 13, 1997 now abandonded.

FIELD OF THE INVENTION

This invention relates in general to imaging systems and print resolution enhancement and, more particularly, to mapping of lower resolution digital data to a higher resolution for subsequent printing on a lower resolution print engine.

BACKGROUND OF THE INVENTION

Electrophotographic processes for producing a permanent image on media are well known and commonly used. In general, a common process includes: (1) charging a photoreceptor such as a roller or continuous belt bearing a photoconductive material; (2) exposing the charged area to a light image to to produce an electrostatic charge on the area in the shape of the image; (3) presenting developer particles (toner) to the photoreceptor surface bearing the image so that the particles are transferred to the surface in the shape of the image; (4) transferring the particles in the shape of the image from the photoreceptor to the media; (5) fusing or fixing the particles in the shape of the image to the media; and (6) cleaning or restoring the photoreceptor for the next printing cycle. Many image forming apparatus, such as laser printers, copy machines, and facsimile machines, utilize this well known electrophotographic printing process.

In laser printers, an image is typically rasterized to form a bit pattern which is stored as a binary image bitmap for subsequent rendering to a final output image. The image bitmap is also referred to as a picture element ("pixel") raster image. In the rasterizing process (i.e., forming the binary bitmap), graphic elements, such as continuous lines (line art) and text character outlines are converted to pixel patterns that approximate the source image shape. Continuous tone data, such as photographic data (both color and gray value images) are also converted to pixel patterns that approximate the source continuous tone image data. However, to effectively portray the original source image for continuous tone data, each pixel of the source image must be represented by multiple bits which define either a color or a gray level and which are subsequently converted, typically, to a binary image bitmap. Hereafter, it is to be understood that when the term "gray" is used, it applies to both color and black/white images and, when applied to a color image, relates to the intensity of the color.

Conventionally, in order to represent gray level images on a bi-level (black and white) printer, the pixel data, if not already gray level, is converted into a gray level, multi-bit configuration. For example, when a multi-bit configuration of 8 bits per pixel is employed, 256 gray levels can be represented by the digital pixel values. The individual gray level pixels are converted to binary level pixels (i.e., bi-level data for subsequent rendering) through the use of a dithering process. Spatial dithering (or digital halftoning) is the converting of the multi-bit pixel values (of a source image) to fixed-size, binary, multi-pixel groupings that approximate the average gray value of the corresponding source data. This dithering process provides a halftone texture to selected areas of the image so as to provide gray value variations therein. Thus, for example, with binary pixels, a 6×6 multi-pixel grouping can, in theory, simulate 36 levels of gray, and an 8×8 grouping can simulate 64 levels.

The dithering process (i.e., halftoning) employs a comparison of the individual pixel values (specified by a source image intensity array) against a threshold matrix (dither matrix or device best threshold array) to control the conversion of the gray level values to appropriate patterns of bi-level data. For purposes of this discussion, a gray level value of 255 in a source image is considered to be "white", and a gray level value of 0 is "black". The threshold matrix comprises a plurality of row-arranged gray level values which control the conversion of the gray level pixel values to bi-level pixel values which are stored in a resultant page buffer array (raster) bitmap. During the dithering process, the threshold matrix is tiled across the image pixels to enable each gray level image pixel to be compared against the correspondingly, logically-positioned gray level value of the threshold matrix. In essence, each entry in the threshold matrix is a threshold gray level value which, if exceeded by the source image gray level pixel value, causes that gray level image pixel to be converted to a "white" pixel (or, in this example, a binary logical "zero" for laser modulation purposes in the electrophotoconductive process). If, by contrast, the source image gray level pixel value is less than or equal to the corresponding threshold matrix gray level value, it is converted to a "black" pixel (or a binary logical "one" for laser modulation purposes).

Thus far, the discussion has focused on the differences between rasterizing text (or line art) and halftone images. However, in either case, once a raster page buffer array bitmap is generated from a source image, whether the image is text, line art, or halftone, the desired output image is created (rendered) by causing a laser to be modulated in accordance with the bit pattern stored in the image page buffer array bitmap. The modulated laser beam is scanned across a charged surface of a photosensitive drum in a succession of raster scan lines. Each scan line is divided into the pixel areas dictated by the resolution of the bitmap and the pitch of the laser scan. The modulated laser beam causes some pixel areas to be exposed to a light pulse and some not, thus causing a pattern of overlapping dots on each scan line. Where a pixel area (dot) is illuminated, the photosensitive drum is discharged, so that when it is subsequently toned, the toner adheres to the discharged areas and is repelled by the still charged areas. The toner that is adhered to the discharged areas is then transferred to paper and fixed in a known manner.

In general, the fidelity of the output image relative to the source data is directly related to the resolution of pixels (dots) in the output image. Arbitrary analog images cannot be exactly reproduced by a bitmap raster unless an infinite resolution is used. For example, as a result of the images's pixel configuration, image edges that are either not parallel to the raster scan direction or not perpendicular to it appear stepped. This is especially noted in text and line art.

Various techniques have been developed to improve the quality of the output image of a raster bitmap. These enhancement techniques include: edge smoothing, fine line broadening, antialiasing (to smooth jagged edges), and increasing the resolution of the laser printer. These enhancing techniques typically modify the signals to the laser to produce smaller dots that are usually offset from the pixel center, or in other words, to produce gray scale dots.

Although the prior art has attempted in a variety of ways to overcome the stepped appearance of pixel image edges for text and line art, an example of one of the more widely used techniques is described in U.S. Pat. No. 4,847,641 to Tung, the disclosure of which is incorporated in full herein by reference. Tung discloses a character generator that produces a bitmap of image data and inputs that bitmap into a first-in first-out (FIFO) data buffer. A fixed subset of the buffer stored bits forms a sampling window through which a selected block of the bitmap image data may be viewed (for example, a 9×9 block of pixels with the edge pixels truncated). The sampling window contains a center bit cell which changes on each shift of the image bits through the FIFO buffer. As the serialized data is shifted, the sampling window views successive bit patterns formed by pixels located at the window's center bit cell and its surrounding neighbor bit cells. Each bit pattern formed by the center bit and its neighboring bits is compared in a matching network with prestored templates. If a match occurs, indicating that the center bit resides at an image edge and that the pixel it represents can be altered so as to improve the image's resolution, a modulation signal is generated that causes the laser beam to alter the center pixel configuration. In general, the center pixel is made smaller than a standard unmodified bitmap pixel and is possibly moved within the confines of the pixel cell. The pixel size alteration is carried out by modulating the laser contained in the "laser print engine" of the laser printer. One drawback of the Tung method is that the pixel alteration is accomplished only by accounting for shifting uni-dimensionally in the scan direction the modulation of the laser within the confines of the pixel cell. The system taught by Tung is now generally referred to as Resolution Enhancement Technology (RET) and enables substantially improved image resolutions to be achieved for text and line art over actual print engine resolution capability.

The limitation of Tung has been overcome by techniques described in U.S. Pat. Nos. 5,193,008 and 5,134,495, issued to Frazier et al., the disclosures of which are incorporated in full herein by reference. In general, the Frazier et al. patents employ an edge smoothing technique which also change laser pulse exposure times in accordance with template comparisons to selected pixels in an image. Importantly, their process utilizes an initial binary image that is at a level of resolution (e.g., 600 dot per inch (dpi)) that is higher (e.g., double) than that which the designate printer can output (i.e., the raster capability/resolution of the printer is only 300 dpi). A logical window is then stepped, at 600 dpi, across the entire image plane. At each step of the window, the higher resolution pixel arrangement is compared to pre-existing templates and, upon a match, causes an altered modulation of the printer's laser beam. The modulated laser beam produces on a photoreceptor not only a gray level central pixel at the lower resolution, but also sufficiently exposes the photoreceptor about the edges of a central pixel to enable scans by adjacent scan lines to combine to create intermediate pixels between the scan lines (i.e., create intermediate pixels in the process direction) which provides an edge smoothing effect.

More specifically, pixel dots are created half-way between adjacent horizontal scan lines (the horizontal scan lines defining the raster capability of the printer) by energizing a plurality of pixels on adjacent scan lines so that the sum of the energies applied to intermediate pixel points (those points defined by overlapping adjacently exposed areas) is above a threshold level—thereby enabling the intermediate pixel points to be later toned. Frazier et al. employ a "look up table" based upon a template view of the source bitmap. Both of the Frazier et al. patents teach that the entire image plane is created at a higher level of resolution, with the initial image data being received at the higher level of resolution, thereby requiring a substantial memory allocation. The Frazier et al. technology has come to be known as "Resolution Doubling".

In short, conventional resolution enhancement techniques generally require more source digital data of a higher resolution format to achieve the enhancement desired than what the printer resolution is actually capable of. However, it is advantageous to work initially with lower resolution source data rather than higher resolution source data from a data processing perspective. Specifically, it is much less time consuming (less data to be processed) and cheaper (less hardware or memory intensive) to work with lower resolution data than higher resolution data.

Accordingly, an object of the present invention is to achieve improved resolution enhancement, in both the scan and process direction, when processing source data of a resolution that is equal to (or less than) the resolution of the destination print engine. In contrast, an object of the aforementioned co-pending application Ser. No. 08/855,253 is to improve resolution enhancement when processing lower resolution source data with a higher resolution print engine.

SUMMARY OF THE INVENTION

According to principles of the present invention in a preferred embodiment, lower resolution source data is synthesized to a higher resolution format for subsequent rendering on an output device having a same lower resolution (raster scanning) capability as the source data. Synthesis occurs by selecting and using a synthesis template that represents a configuration of a plurality of pixel data in the higher resolution format into which the lower resolution source data is to be synthesized. A working or active pixel is identified from the lower resolution source data, a synthesis template is selected (or generated), and then the synthesis template pixel data is substituted for the working pixel for rendering on the output device. The synthesized higher resolution data is subsequently rendered in a manner such that dots represented by the synthesized data are formed interstitially relative to the given lower raster/resolution capability of the output device.

According to further principles, the working pixel is identified in the lower resolution data by recognizing a configuration of a plurality of pixel data adjacent the working pixel (i.e., a working template match). The synthesis template that is generated from the working template match comprises at least a two by two cell matrix for pixel placement in the higher resolution format. Pixels in the synthesis template are cooperatively formed to provide an apparent merge of the pixel data in the higher resolution format with the adjacent pixel data of the lower resolution format data. The same synthesis template may, optionally, be used at varying levels of rendering, such as for each working pixel evaluated to be synthesized and rendered, for each page strip, or for each page of data to be rendered.

Other objects, advantages, and capabilities of the present invention will become more apparent as the description proceeds.

DETAILED DESCRIPTION OF THE INVENTION

Figure 1:
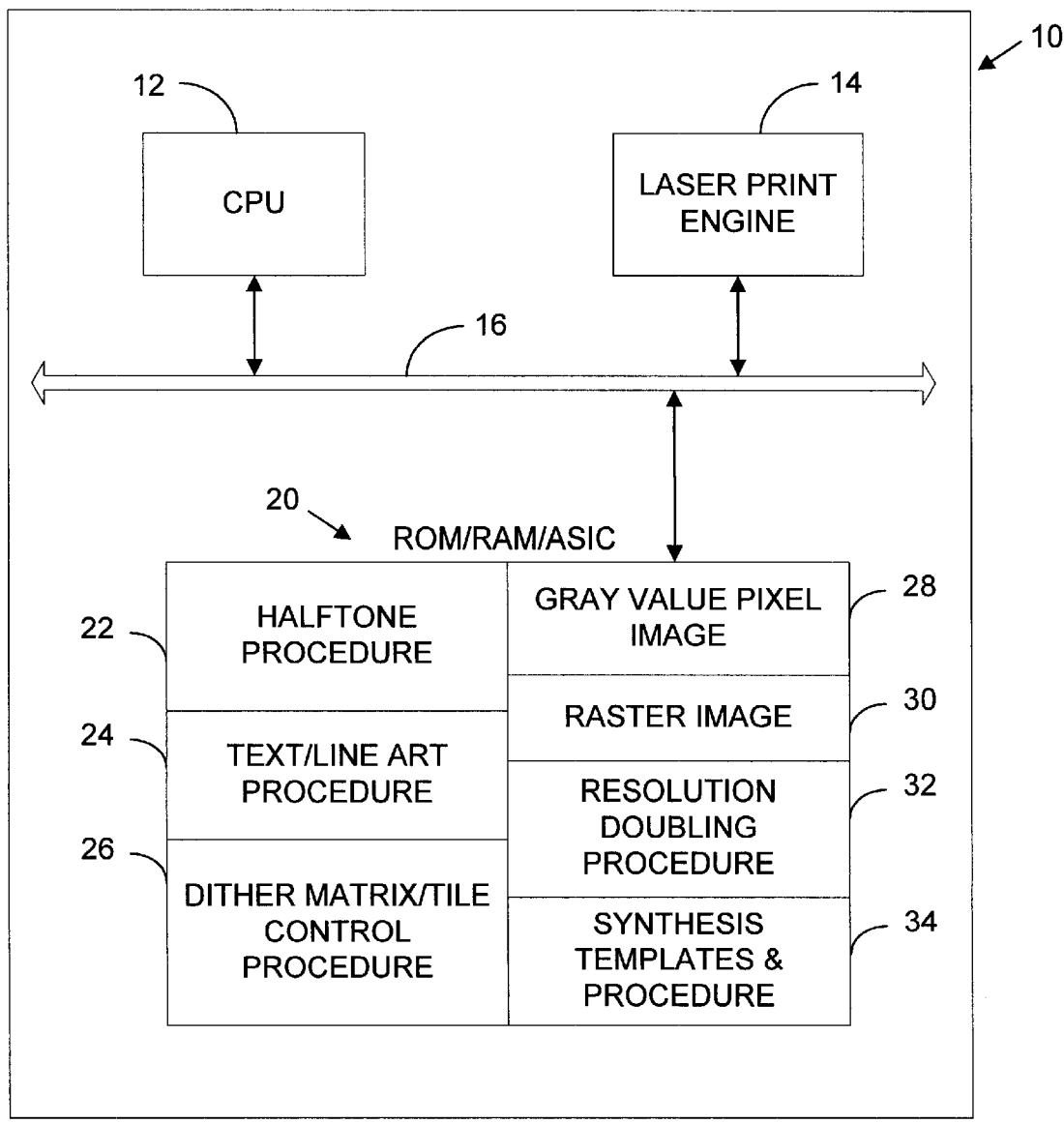
FIG. 1 is a block diagram of a laser printer incorporating the invention hereof.

FIG. 1 is a block diagram of a laser printer 10 that incorporates the invention hereof for enhanced rendering of source raster image (data) 30 having a resolution that is less than or equal to the raster scan resolution of the print engine 14. It is to be understood that while a laser printer will be hereafter described, the invention is equally applicable to other devices which render pixel data. More specifically, such devices include laser printers, copiers, facsimile devices, display monitors, etc. Moreover, the invention is equally applicable with respect to binary or multi-bit pixel source image data. Additionally, the invention is equally applicable to laser print engines that are multi-resolution capable (for example, 300 and 600 dpi). However, the discussion is focused specifically in the context of source image data that is received at a resolution that equals the highest resolution (raster scan) capability of the print engine, synthesizing that source image data to an even higher resolution format than that of the raster scan capability of the print engine, and then rendering the source image data on the printer to obtain an enhanced resolution output.

Laser printer 10 comprises a central processing unit (CPU) 12 and a laser print engine 14, interconnected via a bus 16. Print engine 14 is capable of raster scanning an image at a given resolution, for example, 600 dot per inch (dpi). A read only memory (ROM) and/or random access memory (RAM) and/or application-specific integrated circuit (ASIC) 20 is/are also interconnected to bus 16. For simplicity of illustration and discussion purposes, ROM/RAM/ASIC 20 is shown as a single block unit although as is well known in the art they are generally separate units for providing specific functionalities. It is also to be understood that the rasterizing, synthesizing and rendering procedures and data discussed herein for printer 10 may be maintained and utilized as control firmware in any conventional ROM, and/or implemented in an ASIC for high-speed hardware functionality, and/or implemented in connection with RAM for storage and buffering purposes (all as depicted with ROM/RAM/ASIC block 20).

ROM/RAM/ASIC 20 includes procedures and data necessary to enable CPU 12 to carry out the rasterizing, synthesizing and rendering functions of the invention, along with other conventional functions (some not shown). More specifically, ROM/RAM/ASIC 20 includes halftone procedure 22, text and line art procedure 24, dither matrix and tile control subprocedure 26, and a gray value pixel image 28 which is to be altered into a source raster image 30, suitable for rendering by laser print engine 14. Gray value pixel image 28 is received from a host processor (not shown) at a resolution less than or equal to that of the resolution capability of print engine 14 (i.e., 600 dpi in this example). Raster image data 30 is a two dimensional array of pixel data, with each pixel represented by one or more bits. Raster image 30 may be buffered in RAM or fed directly from an ASIC to print engine 14. Resolution doubling procedure 32 provides rendering in a manner such that dots are formed interstitially relative to the given raster/resolution capability of print engine 14. Synthesis templates and procedure 34 enable synthesizing of raster image 30 to a higher resolution format over that of print engine 14.

Gray value pixel image 28 is of the known type, for example, wherein each pixel is represented by a multi-bit gray value. If gray value pixel image 28 is a color image, it will comprise (generally) four color planes with three of the color planes representing cyan, magenta and yellow color values (or red, green and blue color planes). Moreover, each color value in each plane may be represented by a predetermined number of bits—for example, by 8 bits. A fourth plane, representing black, may be comprised of single or multiple bit values at each pixel location where a black or gray scale image value is to appear on the ultimate rendered output. Thus there may be a total of 25 to 32 bits per pixel in gray value pixel image 28 if color is embodied. On the other hand, if gray value pixel image 28 is a non-color image, each pixel may, for example, be represented simply by 8 bits to depict 256 levels of gray as well known in the art. Other bit depths and color planes, such as in hi-fi printing, are equally applicable in the present invention, as will be obvious to those of ordinary skill in the art.

The object of halftone procedure 22 (along with dither matrix/tile control subprocedure 26) is to convert any continuous tone image within gray value pixel image 28 into a halftoned raster image (data) 30. Text/line art procedure 24 also converts any text and line art images within gray value pixel image 28 into raster image 30. These may be conventional procedures known in the art.

Laser print engine 14 is capable of rendering raster image 30 at its (the print engine's) given dpi resolution. For purposes of this discussion, print engine 14 is a 600 dpi engine. Under principles of the present invention, raster image 30 is received and stored at a resolution format that is less than or equal to the resolution format of print engine 14. Resolution is improved upon rendering by using synthesis templates and procedure 34 to "synthesize" selected pixels of the source raster image 30 into a configuration of a plurality of pixels in a higher resolution format (higher than what is defined by the raster scan capability of print engine 14) prior to rendering on print engine 14. Subsequently, this synthesized higher resolution format data is rendered on print engine 14 using resolution doubling procedure 32. Resolution doubling procedure 32 includes the method(s) defined in the Frazier et al. patents incorporated in full herein by reference.

These steps of increasing the resolution over that capable of the print engine, and then rendering using the resolution doubling techniques, enable enhanced rendering of raster image 30, even at the given resolution capability of engine 14 (which is equal to or greater than that of raster image data 30). Importantly, these steps allow raster image data 30 to be stored and processed at the "lower" resolution format (lower relative to the synthesized data) for significant savings in both memory consumption and processing requirements. For ease of discussion purposes, the resolution capability of print engine 14, and the resolution associated with source raster image 30, will be referred to herein as the "lower" resolution format. This is in relative reference to the "higher" resolution format created and defined by the synthesizing process 34.

Synthesis templates 34 define a plurality of unique "templates" wherein each template represents a configuration of a plurality of pixel data in the higher resolution format into which selected pixels of the lower resolution format image data 30 are to be "synthesized". Alternatively, each template represents a configuration of a plurality of pixel data in an intermediate resolution format, i.e., a resolution format that is higher than the lower resolution format but not necessarily as high as a final, desired resolution format. The templates are formed and stored 34 (i.e., in ROM/RAM/ASIC 20) prior to synthesizing or rendering. Also, it should be noted that the term synthesis "templates" as used herein refers to stored configurations of pixel data and/or algorithms capable of representing the same.

In any case, "synthesizing" means converting a lower resolution pixel into a unique configuration of a plurality of higher resolution format pixels. This unique configuration represents a "best fit" or "improved" visual identical over the selected pixel with respect to the selected pixel's adjacent pixel data. In essence, an apparent merge of the lower resolution pixel data with the plurality of pixels in the higher resolution format is provided such that the overall image appears visually more pleasing and/or perceptually indistinguishable from the higher resolution format. The synthesis templates pixel placement (i.e., "best fit" or "visual identity") is achieved through empirical evaluations of template comparisons with exemplary data generated to mimic a pixel configuration of the working pixel and adjacent pixel data of the lower resolution format data. The empirical evaluations are tuned by psychometric evaluations and/or by artificial intelligence training programs (algorithms) to create the improved visual identity with the higher resolution rendering.

In contrast to "synthesizing", conventional scaling is accomplished with a straight forward block mapping of a single, lower resolution pixel to a full block of higher resolution pixels, regardless of the context of the lower resolution pixel and its surrounding pixel data. For example, a single 600 dpi pixel that is to be scaled up to 1200 dpi resolution is mapped directly to a block of four 1200 dpi pixels (two horizontal pixels and two vertical). Thus, image integrity may in fact diminish at the 1200 dpi level if 600 dpi data is scaled in a conventional manner. This is unacceptable for many of today's printing standards. On the other hand, "synthesizing" clearly improves image quality by incorporating a psychometric component in the empirical tuning to create visual identity. Although conventional scaling or other similar converting techniques (that accomplish a general scaling effect) are usable under general principles of the present invention, "synthesizing" is preferred.

Figure 2A:
FIGS. 2A–P depict exemplary synthesis templates.
Figure 2B:
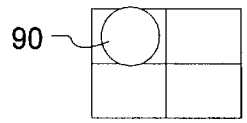
Figure 2C:
Figure 2D:
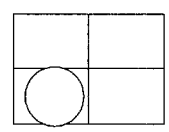
Figure 2E:
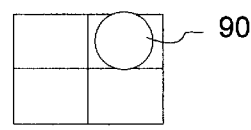
Figure 2F:
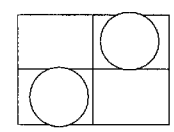
Figure 2G:
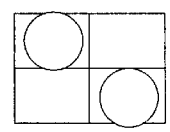
Figure 2H:
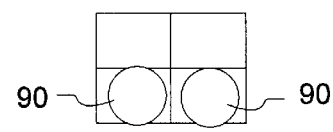
Figure 2I:
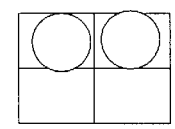
Figure 2J:
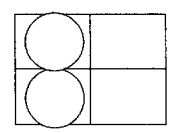
Figure 2K:
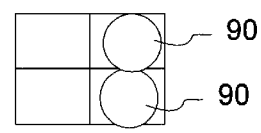
Figure 2L:
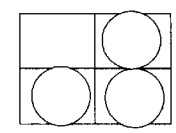
Figure 2M:
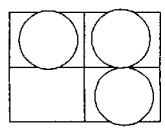
Figure 2N:
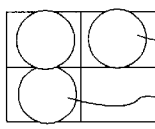
Figure 2O:
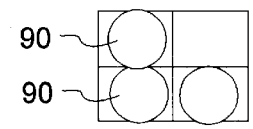
Figure 2P:
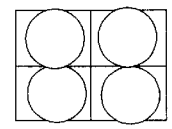

FIGS. 2A–P depict the 16 different synthesis templates for an exemplary two-by-two cell matrix representation for pixel placement in the higher resolution format. FIG. 2A depicts a two-by-two matrix with no pixels therein. FIGS. 2B–2P depict all the placement variations for pixels 90 therein. Although a two-by-two matrix is shown, it is obvious that other sizes are equally applicable. The size of the template cell matrix used is determined by the amount of increase in resolution that is to occur. In this example, an increase in resolution of a factor of two is used (i.e., synthesize from 600 dpi to 1200 dpi). Thus, the two-by-two cell matrix synthesis templates of FIGS. 2A–P are used (or any subset of them). On the other hand, the 600 dpi resolution data could be increased in resolution (synthesized) by a factor of four (i.e., to 2400 dpi) and, thus, four-by-four cell matrix synthesis templates (not shown) would be used. Alternatively, selected pixel data is synthesized multiple times. For example, two synthesis processes utilizing two-by-two cell matrix templates can be cascaded together to effectuate an intermediate synthesis from 600 dpi to 1200 dpi, and then a final synthesis from 1200 dpi to 2400 dpi. In this cascading scenario, rendering only occurs after the final synthesis step is completed. In any case, the number of different pixel configurations for any given template is $c^2$, where c is the number of cells in the template matrix.

Figure 3:
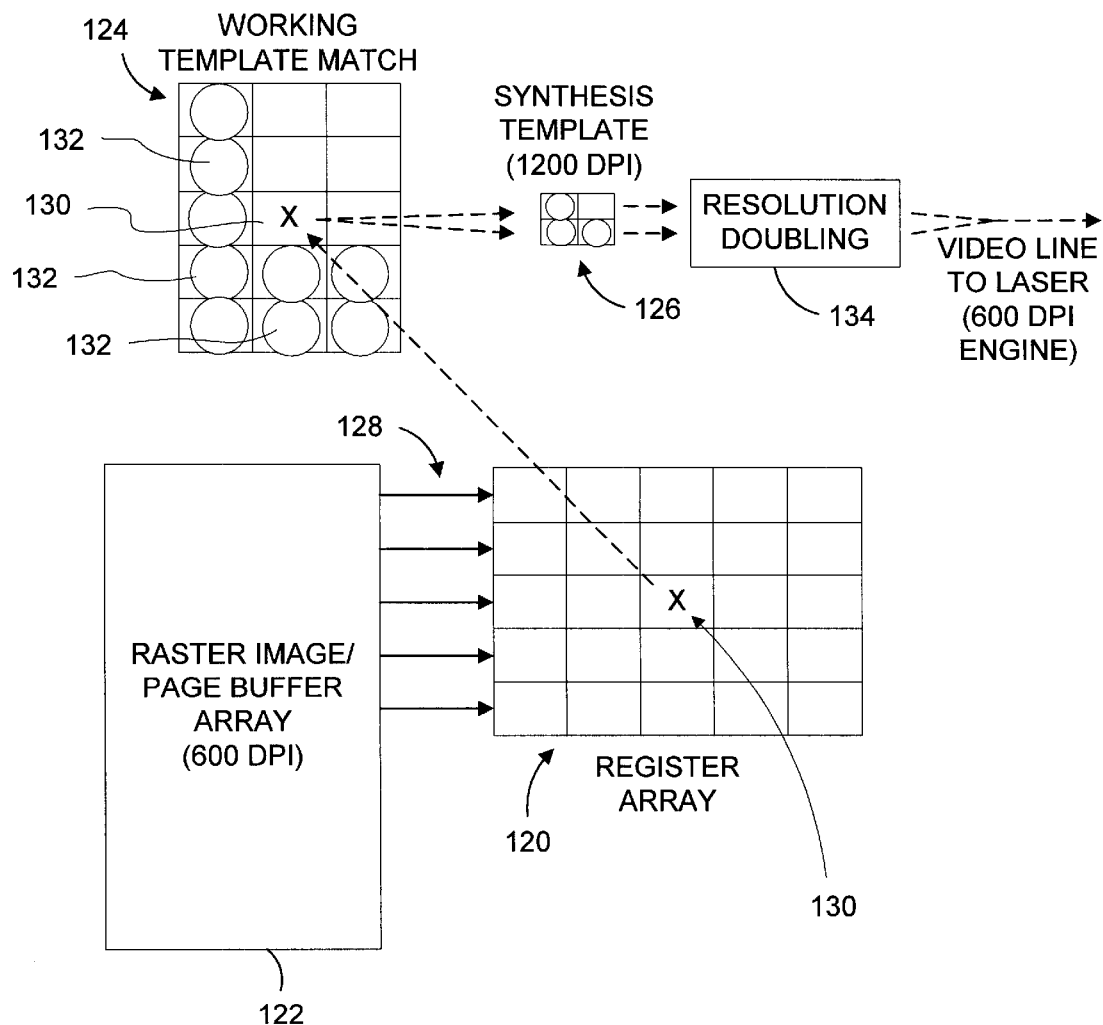
FIG. 3 is a block diagram depicting synthesis template matching of the present invention in a laser printer rendering process.

FIG. 3 is a block diagram of register array 120 (evaluation window), raster image array 122, working template match 124, and synthesis template match 126 of laser printer 10. These further describe the system and method of synthesizing lower resolution data for subsequent resolution doubling 32, 134 according to the present invention. Register array 120 is a 5×5 array (for this example) and receives data in a conventional manner from raster image/page buffer array 122 through five line 600 dpi buffers 128. Raster image/page buffer array 122 holds raster image data 30 in a 600 dpi format. Center bit cell 130 in register array 120 is marked with an "X" to show the active/working cell/pixel for which rendering occurs as data is serially shifted through register array 120.

Working pixel 130 is template matched 124 against previously stored templates by known methods (such as described in U.S. Pat. No. 4,847,641). Working template match 124 is used to identify which pixel is to be synthesized. For example, typically, an edge pixel in text or line art may be identified for synthesizing purposes. Alternatively, however, a match may occur for synthesizing continuous tone data where appropriate. In either case, if a working template match 124 occurs, the working pixel 130 is synthesized using synthesis template match 126 under principles of the present invention. In essence, working pixel 130 is identified 124 in the lower resolution data as a candidate for synthesizing by recognizing a configuration of a plurality of pixel data 132 adjacent the working pixel (i.e., the template match). Consequently, a synthesis template 126 is selected (or it can be said, is identified or generated from the working template match 124) into which working pixel 130 is synthesized. In the event raster image data 30 (and thus working pixel 130) is binary data, then synthesis template 126 selection may occur based directly on working template match 124 (i.e., the synthesis template 126 is a generated output of the working template match 124). Alternatively, in the event raster image data 30 (and thus working pixel 130) is multi-bit data, then a subset of the multi-bit data may define (include) encoded data for identifying synthesis template 126. For example, if four bits define working pixel 130, then three of the bits may define any one of 16 different possible synthesis templates to be used (i.e., for a two-by-two cell synthesis template).

Still in reference to the example depicted in FIG. 3, a two-by-two cell synthesis template 126 is used for a doubling (2×) of the 600 dpi working pixel 130 to 1200 dpi. If quadruple (4×) the synthesis scale factor is desired, then synthesis template 126 would be a four-by-four cell template, or two synthesis processes utilizing the two-by-two cell matrix template 126 can be cascaded together to effectuate the synthesis from 600 dpi to 1200 dpi and then from 1200 dpi to 2400 dpi.

Synthesis template 126 may be selected any number of ways. For example, it may be dynamically selected for each working pixel 130 identified. Namely, if the working pixel was previously identified as text/line art data or as halftone data, the synthesis template may be dynamically selected to best fit the text, line art or halftone data. On the other hand, the synthesis template may be previously selected and defined for use at a page strip level, page level, or some other defined level of rendering, depending upon processing and system configurations/restrictions. In any case, this synthesis template selection feature provides a dynamic (or programmable) feature for the mapping of lower resolution data to a higher resolution configuration for subsequent enhanced rendering on the lower resolution printer 10.

Whatever synthesis template is selected (generated), that template configuration of pixel data in the higher resolution format is substituted for the working pixel 130 for rendering on the lower resolution output device (print engine 14). The lower resolution print engine 14 renders the synthesized image data in a "resolution doubling" manner 134 such that at least one dot represented by the higher resolution (synthesized) image data is formed interstitially relative to the given raster capability (lower resolution) of the print engine. Again, this "resolution doubling" is accomplished as defined in the Frazier et al. patents incorporated in full herein and, as such, further detail is deemed unnecessary in this disclosure.

Figure 4:
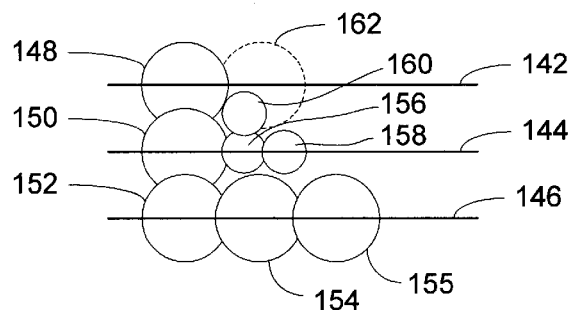
FIG. 4 is a pixel map showing lower resolution scan lines of a print engine relative to certain same lower resolution pixels and certain synthesized higher resolution pixels, and wherein some of the synthesized higher resolution pixels are formed interstitially relative to the lower resolution scan lines.

However, to further illustrate the present invention in cooperation with Frazier et al., FIG. 4 represents a pixel map showing lower resolution scan lines 142, 144 and 146 of print engine 14, exposed lower resolution pixels 148, 150, 152, 154 and 155 (representative of source raster image data 30), and synthesized higher resolution pixels 156, 158 and 160. Note that synthesized pixel 160 is located interstitially relative to scan lines 142 and 144. As such, interstitial (or intermediate) pixel 160 is created (rendered) by partially exposing pixel 162 (but pixel 162 is insufficiently exposed to create an actual dot on scan line 142), in combination with the overlap of the exposure of pixels 148, 150, 156 and 158, all as taught in Frazier et al. Importantly, synthesized pixels 156, 158 and 160 were generated under the present invention (from source raster image data 30) to exceed the resolution of print engine 14, and then rendered using the Frazier et al. technique.

Figure 5:
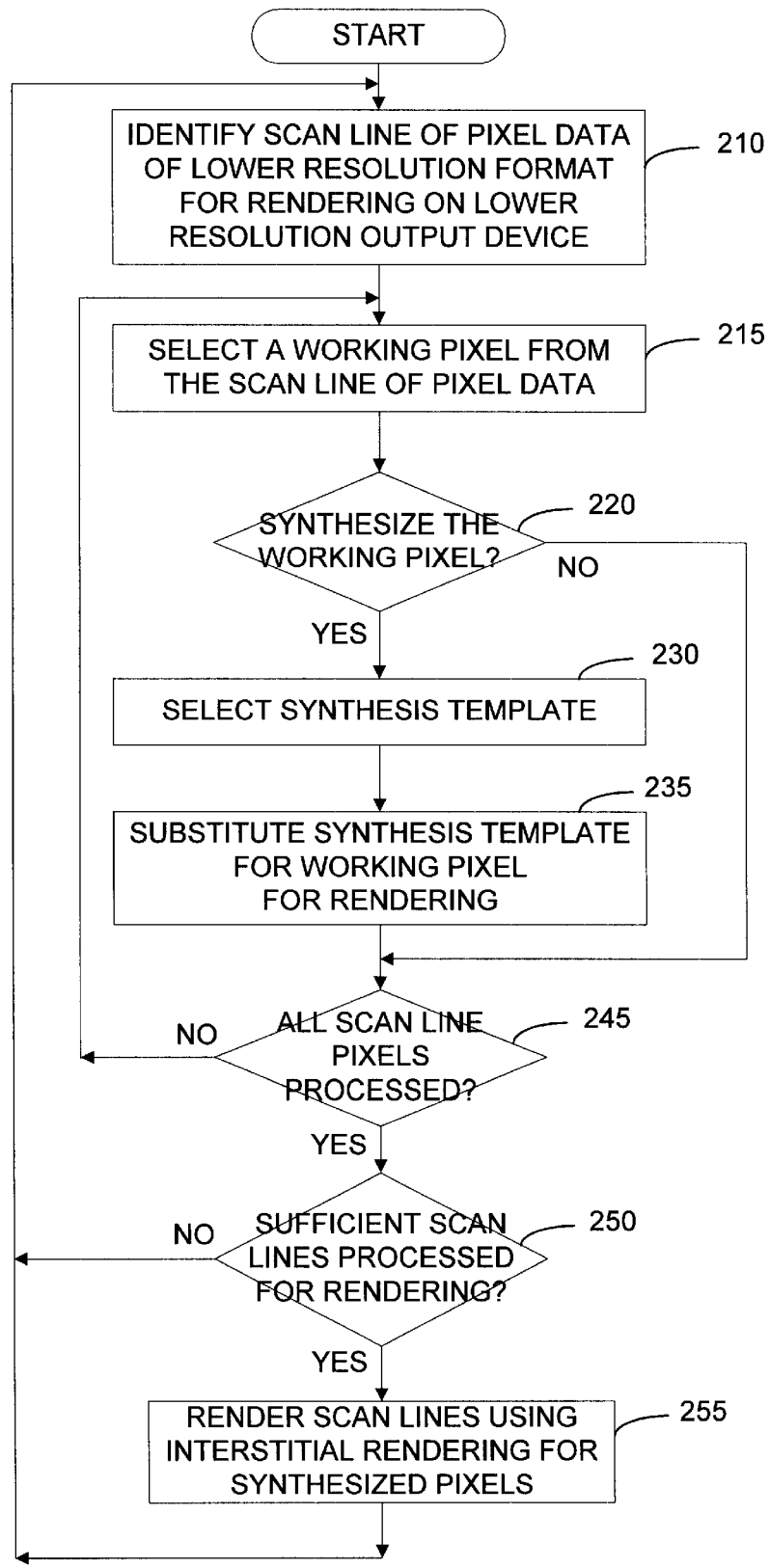
FIG. 5 is a flow chart depicting a preferred method of the present invention.

Referring now to FIG. 5, a flow diagram demonstrates a preferred method of the present invention. First, 210, a scan line of lower resolution format raster image pixel data 30 is identified for rendering processing on an imaging device 10 that has a raster scan capability equal to (or greater than) the lower resolution of raster image data 30. This "identification" occurs either by copying the data from page buffer array 122 into register array 120 (FIG. 3), or by recognizing that the data is already in register array 120. If register array 120 does not hold a full scan line of pixel data, a counting mechanism is used to count the pixel data as it is processed. To this regard, "identification" of the scan line of pixel data for step 210 may be a virtual aspect.

Next, a working (active) pixel 130 is selected 215 from the scan line of pixel data (as the data is serially shifted through register array 120). It must then be determined whether the working pixel is to be synthesized 220 into the higher resolution format. For example, if the data is recognized as text or line art, and if the working pixel is an edge pixel, then it may be synthesized for improved edge resolution. Alternatively, if the data is halftone data, then the working pixel may be synthesized for improved halftone imaging.

In either case (i.e., whether the data is text, line art or half tone), in a preferred embodiment the working pixel is identified for synthesis in connection with a working template match 124 (FIG. 3). A working template match 124 identifies (or generates) 230 synthesis template 126 for enabling an apparent merge ("best fit" or "visual identity") of the pixel data in the higher resolution format (synthesis template 126) with the pixel data 132 that is in the lower resolution format and adjacent the working pixel 130.

If the working pixel 130 is not to be synthesized 220 (i.e., no template match, for example, because the pixel is interior to an edge in text or line art data), then the lower resolution data is used for subsequent rendering purposes. In contrast, if the working pixel is identified to be synthesized, then a synthesis template 126 is identified or selected 230. As discussed, the synthesis template may be a previously selected template (i.e., relative to a page strip or page of data) or it may be uniquely selected (i.e., for edge enhancement or continuous tone enhancement purposes) relative to each working pixel identified. And, again, in the case of binary source image data 30, the synthesis template 126 may be identified directly as a result of the working template match 124. Alternatively, in the case of multi-bit source image data 30, synthesis template 126 may be generated (upon a working template match 124) by a multi-bit encoding scheme embedded within the multi-bit source image data 30. In any case, the synthesis template represents a configuration of a plurality of pixel data in the higher resolution format into which the working pixel is to be synthesized (the higher resolution format being higher than the raster scan capability of print engine 14). Once the synthesis template is selected 230, it is then substituted 235 for the working pixel (or in other words, the synthesized higher resolution pixels are substituted for the lower resolution working pixel) for rendering purposes.

If all the pixels in the identified scan line have not been processed 245, then control returns to select a next working pixel 215 to continue processing of the scan line. On the other hand, if all the scan line pixels have been processed 245, then a determination is made as to whether sufficient scan lines have been processed 250 for enabling rendering under Frazier et al. Typically, this will include a storing (i.e., in RAM) of at least one scan line of data 142 (FIG. 4) so that adjacent pixels 148 and 162 can be identified that must be modulated (per Frazier et al.) in order to properly render any synthesized interstitial pixels 160. The number of scan lines stored and whether sufficient scan lines have been processed 250, depends upon "the resolution doubling" processing window size used in the Frazier et al technique. For example, if a three column/four row processing window is used, then only one scan line need be stored. In the end, if sufficient scan lines have been processed 250, then rendering occurs 255 for those scan lines per Frazier et al. as discussed earlier herein.

Finally, what has been described above are the preferred embodiments of a system and method for synthesizing pixel data from a lower resolution to a higher resolution for rendering on an output device capable of raster scanning at the lower resolution. With the synthesized, higher resolution pixel data, rendering occurs on the lower resolution output device using interstitial rendering techniques as taught by Frazier et al. While the present invention has been described by reference to specific embodiments, it will be apparent that other alternative embodiments and methods of implementation or modification may be employed without departing from the true spirit and scope of the invention.

What is claimed is:

1. A method of rendering raster image data on an imaging device having a given raster capability, the method comprising:

(a) receiving raster image data defined at a resolution less than or equal to the given raster capability of the imaging device;

(b) converting the raster image data to a resolution format greater than the given raster capability of the imaging device thereby forming increased resolution format image data; and, (c) rendering the increased resolution format image data with the imaging device in a manner such that at least one dot represented by the increased resolution format image data is formed interstitially relative to scan lines defined by the given raster capability of the imaging device.

2. The method of claim 1 wherein converting the raster image data to a resolution format greater than the given raster capability of the imaging device includes synthesizing the raster image data.

3. The method of claim 2 wherein synthesizing the raster image data includes:
  (a) identifying a working pixel from the raster image data for synthesizing to a higher resolution format, the raster image data being defined in a lower resolution format relative to the higher resolution format;
  (b) selecting a synthesis template that represents a configuration of a plurality of pixel data in the higher resolution format into which the working pixel is to be synthesized; and,
  (c) substituting the synthesis template pixel data for the working pixel for subsequent processing.

4. The method of claim 3 wherein the working pixel is identified in the lower resolution data by recognizing a configuration of a plurality of pixel data adjacent the working pixel.

5. The method of claim 3 wherein the synthesis template comprises at least a two by two cell matrix representation for pixel placement in the higher resolution format.

6. The method of claim 3 wherein the synthesis template is selected from a plurality of predefined templates, and wherein each of the predefined templates defines a unique pixel configuration in the higher resolution format, the pixel configuration formed to provide an apparent merge of the synthesized image data in the higher resolution format with adjacent pixel data of the working pixel of the lower resolution format data such that a resultant image rendering is visually pleasing and/or perceptually indistinguishable from the higher resolution format.

7. The method of claim 3 wherein the step of substituting the synthesis template pixel data for the working pixel includes making available for rendering purposes or for further synthesizing a subset of the configuration of the plurality of pixel data in the higher resolution format.

8. The method of claim 3 wherein the step of subsequent processing includes, optionally, (i) rendering the synthesis template pixel data on the imaging device according to step (c) of claim 1, or (ii) repeating steps (a) through (c) of claim 3 with previously selected synthesis template pixel data being substituted in place of the lower resolution format data such that a synthesizing of any original lower resolution format data occurs multiple times in a cascading effect prior to final rendering on an output device according to step (c) of claim 1.

9. The method of claim 1 wherein the imaging device is a display device such as a printer, facsimile device or display monitor.

10. The method of claim 1 wherein the at least one dot represented by the increased resolution format image data is formed interstitially relative to the given raster capability of the imaging device by fully or partially developing (i) a dot represented by the raster image data from which the increased resolution format image data is formed, and/or (ii) selected dots adjacent to the dot represented by the raster image data from which the increased resolution format image data is formed.

11. The method of claim 10 wherein any partially developed dot and/or adjacent dots are insufficiently developed to render visible dots at their respective locations, but in combination are sufficiently developed in overlapping areas to render visible the at least one dot interstitially.

12. The method of claim 11 wherein a signal associated with partially developing any dot is modified or offset pulsed within the respective dot locale.

13. A computer readable medium having computer executable instructions for performing steps including:
  (a) receiving raster image data defined at a resolution less than or equal to a given raster capability of an imaging device;
  (b) converting the raster image data to a resolution format greater than the given raster canability of the imaging device thereby forming increased resolution format image data; and,
  (c) enabling a rendering of the increased resolution format image data with the imaging device in a manner such that at least one dot represented by the increased resolution format image data is formed interstitially relative to scan lines defined by the given raster canability of the imaging device.

14. An imaging device having a given raster capability, comprising:
  (a) apparatus for receiving raster image data, the data being defined at a resolution less than or equal to a given raster capability of the imaging device;
  (b) apparatus for synthesizing the raster image data to a resolution format greater than the given raster capability of the imaging device thereby forming synthesized raster image data; and,
  (c) apparatus for rendering the synthesized raster image data with the imaging device in a manner such that at least one dot represented by the synthesized raster image data is formed interstitially relative to scan lines defined by the given raster capability of the imaging device.

15. The imaging device of claim 14 wherein the apparatus for synthesizing the raster image data includes:
  (a) apparatus for identifying a working pixel from the raster image data for synthesizing to a higher resolution format, the raster image data being defined in a lower resolution format relative to the higher resolution format;
  (b) apparatus for selecting a synthesis template that represents a configuration of a plurality of pixel data in the higher resolution format into which the working pixel is to be synthesized; and,
  (c) apparatus for substituting the synthesis template pixel data for the working pixel for subsequent processing.

16. The imaging device of claim 15 wherein the working pixel is identified in the raster image data of the lower resolution format by recognizing a configuration of a plurality of pixel data adjacent the working pixel.

17. The imaging device of claim 15 wherein the synthesis template comprises at least a two by two cell matrix representation for pixel placement in the higher resolution format.

18. The imaging device of claim 14 wherein the imaging device is a display device such as a printer, facsimile device or display monitor.

19. The imaging device of claim 14 wherein the apparatus for rendering includes means for partially developing (i) a dot represented by the raster image data from which the synthesized image data is formed, and/or (ii) selected dots adjacent to the dot represented by the raster image data from which the synthesized image data is formed.

20. The imaging device of claim 19 wherein the means for partially developing enables a visible development of the at least one dot as a result of a combination of overlapping areas of adjacent dots that are either partially or fully developed.

21. A method of imaging, comprising:
(a) detecting first data defined at a first resolution that is less than or equal to a given raster scan line definition of an imaging device upon which imaging is to occur;
(b) responsive to the first data, generating second data having a second resolution that is greater than the given raster scan line definition; and,
(c) causing the second data to be imaged with the imaging device such that at least some of the second data is imaged offset from the given raster scan line definition.

22. An imaging device, comprising:
(a) a print engine having a given raster scan line definition; and,
(b) a controller in communication with the print engine, the controller configured to:
  (i) receive first data defined at a first resolution that is less than or equal to the given raster scan line definition;
  (ii) responsive to the first data, generate second data having a second resolution that is greater than the given raster scan line definition; and,
  (iii) cause the second data to be imaged with the print engine such that at least some of the second data is imaged offset from the given raster scan line definition.

* * * * *